March 27, 1951     W. A. BEDFORD, JR     2,546,716
SEPARABLE SNAP FASTENER TYPE SOCKET MEMBER
Filed March 25, 1947
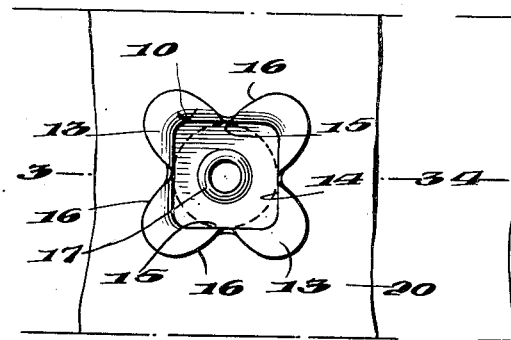
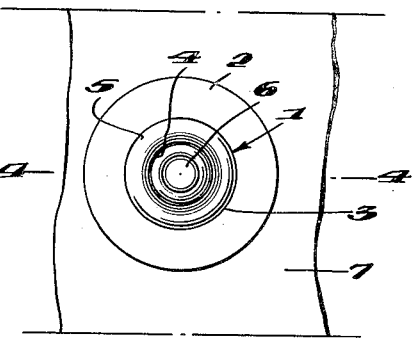
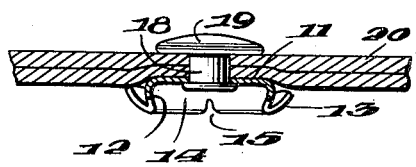
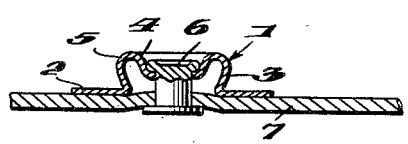
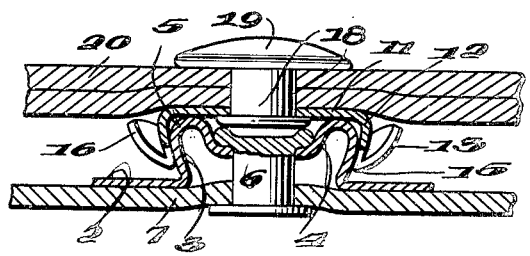
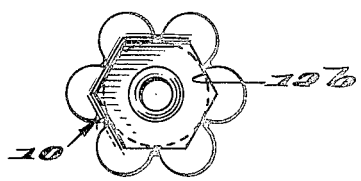
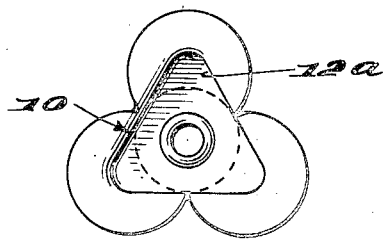
Inventor
WILLIAM A. BEDFORD, JR.
By John Todd
Attorney Patented Mar. 27, 1951

2,546,716

UNITED STATES PATENT OFFICE 2,546,716

SEPARABLE SNAP FASTENER TYPE SOCKET MEMBER

William A. Bedford, Jr., North Scituate, Mass., assignor to United-Carr Fastener Corporation, Cambridge, Mass., a corporation of Massachusetts Application March 25, 1947, Serial No. 736,978

2 Claims. (Cl. 24—217)

The present invention relates to snap fasteners of the type employing cooperating stud and socket members adapted for snap fastener locking engagement with each other, and aims generally to improve the construction of existing snap fasteners.

One of the primary objects of the invention is the provision of a strong fastener having a continuous constricted walled stud and a substantially continuous constricted walled socket member that will be strong and lasting in use even when subjected to relatively heavy loads.

A further object of the invention is the provision of a strong socket member of one-piece construction for snap fastening cooperation with a continuous walled stud.

A still further object of the invention is the provision of an improved socket member having a polygonal shaped stud-receiving opening and which may be manufactured from a variety of materials, such as carbon steel, beryllium copper and like materials that are subject to hardening by heat treatment.

The above and other objects of the invention will be apparent to persons skilled in the art to which the invention relates from a consideration of the accompanying drawings and annexed specification illustrating and describing some preferred embodiments of the invention.

In the drawings—

Fig. 1 is a plan view of a socket member constructed in accordance with the invention as viewed from the stud-receiving opening side thereof;

Fig. 2 is a plan view of one type of stud adaptable for snap fastener engagement with a socket member illustrated in Fig. 1;

Fig. 3 is a vertical sectional view of the socket member as taken on the line 3—3 of Fig. 1;

Fig. 4 is a vertical sectional view of the stud member as taken on the line 4—4 of Fig. 2;

Fig. 5 is an enlarged sectional view of a snap fastener embodying the invention;

Fig. 6 is a plan view, similar to Fig. 1 and illustrating a modified form of socket adaptable for snap fastener cooperation with a stud of the type shown in Figs. 2 and 4; and Fig. 7 is a plan view similar to Fig. 6 of a still further modified form of socket member.

Referring to the drawings, my improved snap fastener comprises a stud member 1 preferably of the continuous wall type for greater strength and a socket member 10 formed from a single piece of metal and preferably having a substantially continuous though yielding stud-receiving socket wall.

The stud member 1 advantageously may be formed from a single piece of metal shaped to provide a support-engaging base 2 and an outwardly extending stud having a continuous outwardly flared wall 3. The outer face of the stud may be counter-sunk as at 4 to provide a continuous annular bead or rim 5 of double thickness construction and of a diameter slightly in excess of the stud neck diameter at the juncture of the wall 3 with the base 2. Such a stud construction, per se, is well known and has been selected as of the preferred type for the improved fastener because of its strength and resistance to distortion and collapse when subjected to pressure. As is usual with such studs the counter-sunk wall 4 may be apertured to receive a tubular rivet 6 or like fastening for securing the stud to supporting piece 7 which may be of any desired material, either flexible or rigid.

The socket member 10 of the invention is preferably formed from a single piece of suitable sheet material, for example sheet metal, shaped to provide a socket having a continuous annular bottom wall 11 and integral continuous side walls 12 constricted at the open end and having an integral outwardly extending support-engaging flange 13. The mouth or stud-receiving opening of the socket, as determined by the minimum dimension of the wall 12, is slightly less than the diameter of the rim 5 and preferably is such as to fit snugly around the neck of the stud 1.

In order that the socket may be engaged with and disengaged from the stud 1 with a snap action, it is necessary that the mouth end of the socket be laterally or radially yieldable, to permit the passage of the stud head 5 therethrough. This is accomplished according to the present invention by making the stud-receiving opening of the socket 1 of polygonal form, the walls 12 being composed of a plurality of substantially straight sections 14 adapted to have bearing engagement with a circular stud head 5 and points 15 midway their length where maximum flexing of the walls 12 may be effected.

As stated above, the outer edges of the tapered walls 12 terminate in outwardly flared support-engaging flanges 13. In order not to interfere with the resiliency or flexing of the mid-points of the straight sections 14, the flanges 13 may be notched as at 16 adjacent the mid-points 15 to permit ready flexibility of the side walls 12 and the mid-points 15 where contact with the circular stud 1 is effected.

As stated above, it is desirable, in some instances that the constricted stud-receiving opening be defined by a continuous wall, this being highly desirable in certain installations, for example, separable electrical contacts and couplings. In other installations, continuity of the wall 12 may not be necessary, and where it is desired to make the socket out of thicker and heavier stock, the mid-points 15 of the walls 14 may be notched as shown in Fig. 3, or even slit towards the bottom wall 11 in order to obtain the desired flexibility.

The socket member 10 may be secured to its supporting material 20 in any suitable manner. As herein shown, the bottom wall is apertured as at 17 to receive a rivet or like fastening 18 passed through the supporting material 20 and upset over the inner face of the bottom wall 11. The head 19 of the rivet 18 may be of any form or shape and when the fastener is used on flexible supports, for example heavy fabric, the head 19 may be capped or otherwise ornamented to make a decorative fastening.

The socket member 10 of the invention may readily be made from a blank of sheet metal from a wide variety of metals of much heavier stock than heretofore has been used for snap fastener sockets. It may be made of brass, carbon steel, beryllium copper, as well as other metals which may be heat-treated for strength, in which case the socket is particularly resistant to crushing forces. When made of beryllium copper the fastener provides a superior electrical contact and coupling.

In Figs. 6 and 7 there are illustrated slightly modified forms of the invention wherein the stud-receiving socket walls 12ª and 12ᵇ may be respectively triangular or hexagonal in shape. The socket construction of the forms shown in Figs. 6 and 7 otherwise conform to that of the embodiment shown in Figs. 1 to 5.

From the above it will be seen that the invention provides a multi-sided or polygonal shaped socket, the stud-engaging wall of which is composed of a plurality of angularly joined straight faces adapted to make contact with a circular stud at their mid-points. The socket thus presents a circular series of V-sections, the apices of the sections being reinforced against deflection by lateral support-engaging flanges and the terminal ends of the V-sections being joined together and rendered radially flexible by the absence of a lateral support-engaging flange.

Although I have illustrated and described a preferred construction of the invention with reference to selected illustrated embodiments, I do not intend to be restricted thereto as the scope of the invention is best defined in the appended claims.

I claim:

1. A snap fastener socket member adapted for fastening engagement with a circular stud comprising a sheet metal socket body having a bottom wall, side walls integral with said bottom wall and extending angularly therefrom in converging relation presenting a restricted multi-sided stud-receiving opening, the outer end of each of said walls forming a side of said opening, and a support-engaging rim connected to said walls at their outer ends and being of less width adjacent the mid-points of said sides to increase the flexibility of the sides adjacent the mid-points thereof relative to the ends thereof.

2. A snap fastener socket comprising a sheet metal socket body having a substantially rectangular bottom wall, side walls extending angularly from the edges of said bottom wall in convergent relation presenting a restricted rectangular stud-receiving opening adapted for snap fastener engagement with a circular stud, the outer extremity of each side wall forming a side of said opening, the mid-sections of said side walls around said rectangular stud-receiving opening being of greater flexibility than the ends thereof, said ends being integrally joined to present solid relatively stiff corners, and support-engaging flanges extending laterally from the rectangular stud-receiving opening from the mid-section of one side wall to the mid-section of an adjacent side wall, each of said support-engaging flanges being integrally joined to contiguous end portions of adjacent side walls.

WILLIAM A. BEDFORD, JR.

REFERENCES CITED

The following references are of record in the file of this patent:

UNITED STATES PATENTS

| Number | Name | Date |
|---|---|---|
| 1,538,350 | Pearson | May 19, 1925 |
| 2,009,876 | Dahlin | July 30, 1935 |
| 2,085,486 | Villani | June 29, 1937 |
| 2,166,894 | Jones | July 18, 1939 |